(12) United States Patent
Curtis et al.

(10) Patent No.: US 10,303,773 B2
(45) Date of Patent: May 28, 2019

(54) CHATBOT SYSTEM AND METHOD (71) Applicant: Massively.ai Inc., Toronto (CA)

(72) Inventors: Ricardo David Curtis, Oakville (CA); Wesley Ka Wai Lui, Oakville (CA)

(73) Assignee: MASSIVELY.AI INC., Toronto (CA)

( * ) Notice: Subject to any disclaimer, the term of this patent is extended or adjusted under 35 U.S.C. 154(b) by 0 days.

(21) Appl. No.: 15/664,133

(22) Filed: Jul. 31, 2017

(65) Prior Publication Data

US 2019/0034409 A1   Jan. 31, 2019

(51) Int. Cl.
*G06F 17/22* (2006.01)
*G06F 17/27* (2006.01)
*G06F 3/048* (2013.01)

(52) U.S. Cl.
CPC ........ *G06F 17/279* (2013.01); *G06F 17/2205* (2013.01); *G06F 3/048* (2013.01)

(58) Field of Classification Search
CPC .............................. G06F 17/279; G06F 17/212
See application file for complete search history.

(56) References Cited

U.S. PATENT DOCUMENTS 8,687,776 B1 *  4/2014  Reynolds ............... G06Q 30/02
                                                       379/88.18
9,761,222 B1 *  9/2017  Scarasso ................. G10L 15/07
9,866,693 B2 *  1/2018  Tamblyn ............. H04M 3/5191
9,912,810 B2 *  3/2018  Segre .................... H04M 3/5191
2006/0069546 A1 *  3/2006  Rosser .................... G10L 15/22
                                                       704/9

(Continued)

OTHER PUBLICATIONS

Perrot, Alexandre, et al. "Large interactive visualization of density functions on big data infrastructure." Large Data Analysis and Visualization (LDAV), 2015 IEEE 5th Symposium on. IEEE, 2015. (Year: 2015).*

*Primary Examiner* — Brian L Albertalli
(74) *Attorney, Agent, or Firm* — Perry + Currier Inc.

(57) ABSTRACT

A method in a chatbot configuration application executable on a computing device, comprising: maintaining in memory a chatbot comprising a plurality of conversation paths, each conversation path representing a different conversation between the chatbot and an end user, each conversation path comprising a plurality of conversation nodes, and each conversation node comprising computer-readable instructions executable by a processor to perform an action; and rendering, on a display device, a graphical user interface (GUI) to display to a configuring user each conversation path and each conversation node in each respective conversation path. For each respective conversation path in the chatbot: retrieving from the memory, a number of end users of the chatbot that have interacted with each respective conversation node in the respective conversation path; determining a measure related to the number of end users of the chatbot that have interacted with each respective conversation node in the respective conversation path; and, rendering, in the GUI at each respective conversation node in the respective conversation path, the measure related to the number of end users of the chatbot that have interacted with the respective conversation node in the respective conversation path.

19 Claims, 9 Drawing Sheets

(56) References Cited

U.S. PATENT DOCUMENTS

| | | | | |
|---|---|---|---|---|
| 2012/0041903 A1* | 2/2012 | Beilby | ............... | G06N 3/004 706/11 |
| 2012/0173243 A1* | 7/2012 | Anand | ............... | H04M 3/4936 704/270.1 |
| 2014/0067375 A1* | 3/2014 | Wooters | ............... | G06F 17/28 704/9 |
| 2015/0121216 A1* | 4/2015 | Brown | ............... | G06N 3/006 715/707 |
| 2015/0195406 A1* | 7/2015 | Dwyer | ............... | H04M 3/5175 379/265.07 |
| 2017/0270951 A1* | 9/2017 | Ekambaram | ............... | G10L 25/63 |
| 2018/0054523 A1* | 2/2018 | Zhang | ............... | H04M 3/5166 |

* cited by examiner

CHATBOT SYSTEM AND METHOD

FIELD

The present disclosure generally relates to chatbot systems and methods, and more particularly, to a chatbot system and method for rendering, in a graphical user interface, information related to chatbots.

BACKGROUND

Chatbots are computer programs designed to simulate intelligent conversations with one or more users of a computing device. Many chatbots simulate a conversation with a user by providing a user interface in which the user of the chatbot, for example, inputs a question and the chatbot interprets the question and displays one or more answers in the user interface. Several different software programs have been developed over the years to facilitate the creation and design of chatbots. A limitation of such known programs, however, is that a lack of feedback is provided to chatbot designers regarding the efficacy of the chatbot.

BRIEF DESCRIPTION OF THE DRAWINGS

For a better understanding of the various implementations described herein and to show more clearly how they may be carried into effect, reference will now be made, by way of example only, to the accompanying drawings in which.

SUMMARY

An aspect of the present disclosure provides a method in a chatbot configuration application executable on a computing device. The method includes retrieving from memory a chatbot comprising a plurality of conversation paths, each conversation path representing a different conversation between the chatbot and an end user, each conversation path comprising a plurality of conversation nodes, and each conversation node comprising computer-readable instructions executable by a processor to perform an action, and rendering, on a display device, a graphical user interface (GUI) to display to a configuring user each conversation path and each conversation node in each respective conversation path. For each respective conversation path in the chatbot the method retrieves from the memory, a number of end users of the chatbot that have interacted with each respective conversation node in the respective conversation path; and determines a measure related to the number of end users of the chatbot that have interacted with each respective conversation node in the respective conversation path. The method also renders, in the GUI at each respective conversation node in the respective conversation path, the measure related to the number of end users of the chatbot that have interacted with the respective conversation node in the respective conversation path.

The action may include outputting a textual message to the end user.

The action may include outputting an image or video to the end user.

The action may include executing a configurable function.

According to another aspect of the present disclosure, determining a measure may include determining a total number of end users of the chatbot that have interacted with the respective conversation node.

According to another aspect of the present disclosure, determining a measure may include determining a percentage of the total number of end users of the chatbot that have interacted with the respective conversation node.

According to another aspect of the present disclosure, rendering the measure may include rendering a heat map.

According to another aspect of the present disclosure, the method may also include selecting one of the conversation nodes; identifying a subset of end users of the chatbot as having a common interaction or a common lack of interaction with the selected conversation node; and broadcasting a message to the subset of end users.

According to another aspect of the present disclosure, the subset of end users has a common lack of interaction with the selected conversation node, and wherein the message comprises an offer to entice the subset of end users of the chatbot to return to interacting with the chatbot.

According to another aspect of the present disclosure, the method may also include rendering in the GUI, a plurality of selectable options, each selectable option associated with a platform for deploying the chatbot, in response to detecting selection of a selectable option of the plurality of selectable options, configuring the chatbot for deployment to the platform associated with the selectable option that is selected, and initiating deployment of the chatbot to the platform associated with the selectable option that is selected.

According to another aspect of the present disclosure, the method may also include retrieving from memory a second chatbot, the second chatbot comprising a plurality of conversation paths, each conversation path representing a different conversation between the second chatbot and an end user, each conversation path comprising a plurality of conversation nodes, and each conversation node comprising computer-readable instructions executable by a processor of a computing device to perform an action, for a conversation path of the second chatbot: determining whether a commonality exists between the conversation nodes of the conversation path of the second chatbot and any conversation nodes of any of the conversation paths of the chatbot; in response to determining that a commonality exists, rendering, in the GUI to the configuring user, an indication of a relationship between the measure related to the number of end users of the chatbot that have interacted with the conversation nodes of the conversation paths of the chatbot for which the commonality exists and a number of end users of the second chatbot that have interacted with the conversation nodes of the conversation paths of the second chatbot for which the commonality exists.

According to another aspect of the present disclosure, the rendering the indication of the relationship may include rendering a heat map.

DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular implementations only and is not intended to be limiting.

It should be understood that many of the functions described in this specification have been described as embodied in programs stored in memory, executable by processors, and running on servers. Programs may indeed be implemented in software for execution by various types of processors. An identified program of executable code may, for instance, comprise one or more physical or logical blocks of computer instructions, which may, for instance, be organized as an object, procedure, or function. Nevertheless, the executables of an identified program need not be physically located together, but may comprise disparate instructions stored in different locations which, when joined logically together, comprise the program and achieve the stated purpose for the program.

A program may also be implemented as a hardware circuit comprising custom VLSI circuits or gate arrays, off-the-shelf semiconductors such as logic chips, transistors, or other discrete components. A program may also be implemented in programmable hardware devices such as field programmable gate arrays, programmable array logic, programmable logic devices or the like.

Indeed, a program of executable code may be a single instruction, or many instructions, and may even be distributed over several different code segments, among different programs, and across several memory devices. Similarly, operational data may be identified and illustrated herein within programs, and may be embodied in any suitable form and organized within any suitable type of data structure. The operational data may be collected as a single data set, or may be distributed over different locations including over different storage devices, and may exist, at least partially, merely as electronic signals on a system or network. The programs may be passive or active, including agents operable to perform desired functions.

Reference throughout this specification to "one implementation" or "an implementation" means that a particular feature, structure, or characteristic described in connection with the implementation is included in at least one implementation of the present invention. Thus, appearances of the phrases "in one implementation" or "in an implementation" in various places throughout this specification are not necessarily all referring to the same implementation.

Furthermore, the described features, structures, or characteristics may be combined in any suitable manner in one or more implementations. In the following description, numerous specific details are provided, such as examples of materials, fasteners, sizes, lengths, widths, shapes, etc., to provide a thorough understanding of implementations of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
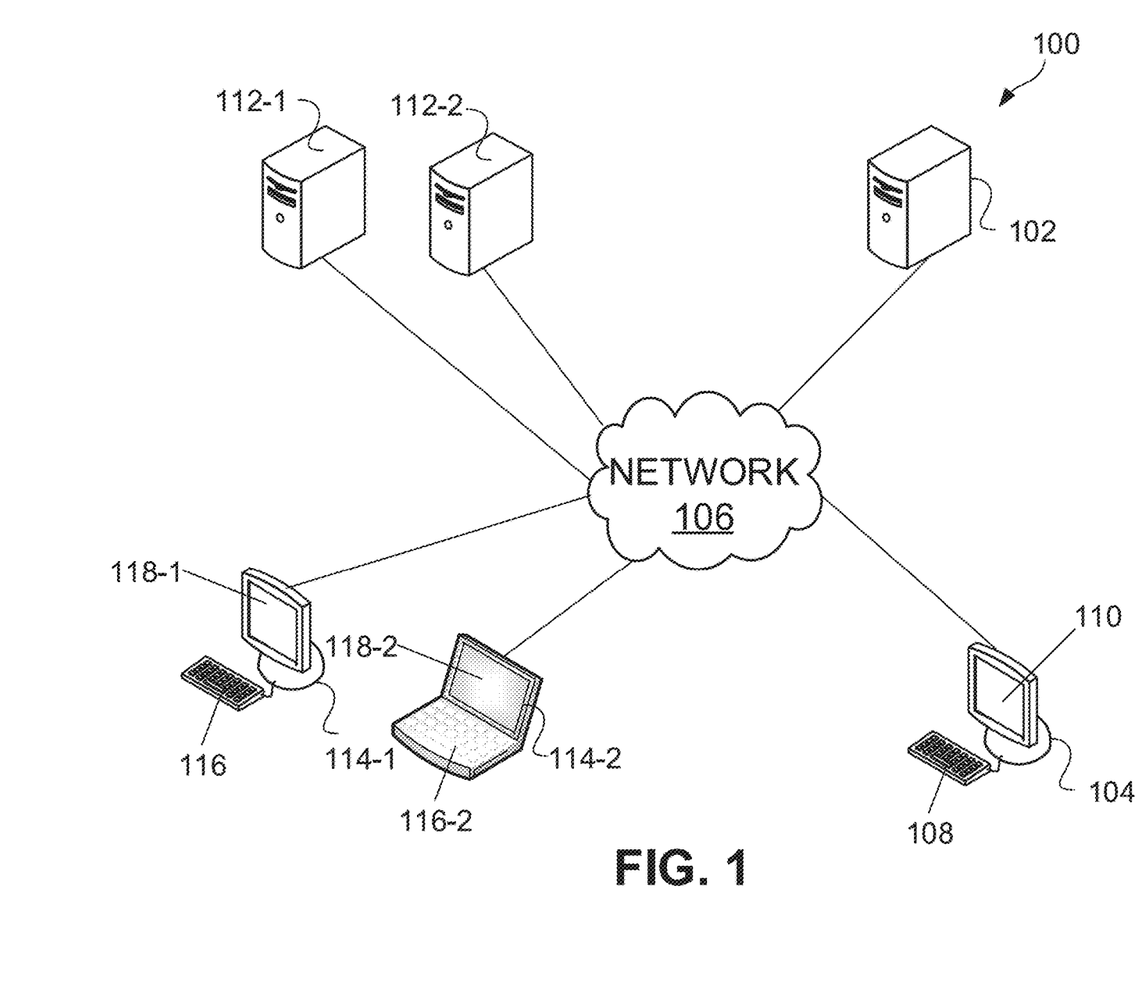
FIG. 1 is a schematic diagram of a chatbot system in accordance with an example implementation of the present disclosure.

A schematic block diagram of an example implementation of a chatbot system 100 (referred to hereinafter as system 100) is shown in FIG. 1. The system 100 includes a chatbot configuration server 102 (referred to hereinafter as server 102) configured to run a chatbot configuration application 210 (FIG. 2) for creating or designing chatbots, modifying chatbots, and deploying chatbots that are created into other computing platforms, such as for example, instant message applications, social media applications, webpages, and the like. The system 100 also includes a client device and a network 106. The server 102 and the client device 104 are configured to communicate with each other using a network 106. The client device 104 can be operated by a user of the chatbot configuring application 210 (shown in FIG. 2). For the purposes of the present disclosure, a user of the chatbot configuration application is referred to hereinafter as a configuring user. In the example implementation shown in FIG. 1, the client device 104 is a desktop computer comprising an input device 108 (a physical keyboard in the implementation shown in FIG. 1), a network interface (not shown), and a display device 110. However, in alternative implementations, the client device 104 can be any suitable type of computing device having an input device, a network interface, and a display device, such as for example, a laptop computer, a notebook computer, tablet computer, smart phone, a mobile device, a netbook, and the like.

The server 102, when running the chatbot configuration application 210, communicates with the client device 104 via the network 106 to provide a graphical user interface (UI) for rendering on the display device 110 of the client device 104. A configuring user of the client device 104 can utilize the input device 108 of the client device 104 to interact with the GUI rendered on the display device 110 to create or design a chatbot, modify a previously created chatbot, or deploy a chatbot that has been created to another computing platform.

The system 100 also includes two application servers 112-1, 112-2 each configured to communicate with the server 102 using the network 106. The server 102 can communicate with each of the application servers 112-1, 112-2 via the network 106 to deploy chatbots 310-1, 310-2 (FIG. 2) created by the chatbot configuration application 210 (FIG. 2) to the application servers 112-1, 112-2. In the example implementation illustrated in FIG. 1, the server 102 deploys chatbot 310-1 (FIG. 3) to the application server 112-1, and a second chatbot 310-2 to the application server 112-2. The application server 112-1 receives the chatbot 310-1 from the server 102 via the network 106, stores the chatbot 310-1 in memory 302-1 (FIG. 3), and integrates the chatbot 310-1 into an application 314-1 (FIG. 3) running on the application server 112-1. Similarly, the application server 112-2 receives the chatbot 310-2 from the server 102 via the network 106, stores the chatbot 310-2 in memory 302-2 (FIG. 4), and integrates the chatbot 310-2 into an application 314-2 running on the application server 112-2.

The system 100 also includes two end user client devices 114-1, 114-2. The end user client device 114-1 is configured to communicate with the application servers 112-1, 112-2 using the network 106. Similarly, the end user client device 114-2 is configured to communicate with the application server 112-1, 112-2 using the network 106. The user client devices 114-1, 114-2 can be operated by users to interact and correspond with the chatbot 310-1 when the chatbot 310-1 is running on the application server 112-1. Similarly, the user client devices 114-1, 114-2 can be operated by end users to interact and correspond with the chatbot 310-2 when the chatbot 310-2 is running on the application server 112-2.

In the example implementation shown in FIG. 1, the end user client device 114-1 is a desktop computer that includes an input device 116-1 (a physical keyboard in the implementation shown in FIG. 1), a network interface (not shown), and a display device 118-1. The end user client device 114-2 is a laptop computer that includes an input device 116-2 (e.g. a keyboard), a network interface (not shown), and a display device 118-2. However, it will be appreciated that in alternative implementations, the end user client devices 114-1, 114-2 can be any suitable type of computing device that includes an input device, a network interface, and a display device, such as for example, a desktop computer, a laptop computer, a notebook computer, tablet computer, smart phone, a mobile device, a netbook, and the like. For the purposes of the present disclosure, the end user client devices 114-1, 114-2 are referred to hereinafter generically as end user client device 114, and collectively as end user client devices 114; the input devices 116-1, 116-2 are referred to hereinafter generically as input device 116, and collectively as input devices 116; and the display devices 118-1, 118-2 are referred to hereinafter generically as display device 118, and collectively as display devices 118.

The application server 112-1, when running the chatbot 310-1, communicates with the end user client devices 114-1, 114-2 via the network 106 to provide a user interface (UI) for rendering on the display device 118 of the end user client device 114-1. The UI enables end users of the end user client device 114-1, 114-2 to communicate with the chatbot 310-1 (FIG. 2) running on the application server 112-1. Similarly, the application server 112-2, when running the chatbot 310-2 (FIG. 2), communicates with end user client devices 114 via the network 106 to provide a user interface (UI) for rendering on the display device 122 of the end user client devices 114. The UI enables end users of the end user client devices 114 to communicate with the chatbot 310-2 running on the application server 112-2.

In the example implementation in FIG. 1, the network 106 can include any suitable combination of: wired networks, wireless networks, cell-phone networks, cellular network networks (including but not limited to 2G, 2.5G, 3G, 4G+, and the like), Bluetooth networks, NFC (near field communication) networks, WiFi networks, WiMax networks, packet based networks, the Internet, analog networks, the PSTN (public switched telephone network), WiFi access points, and the like, and/or a combination thereof.

It will be appreciated that although the system 100 shown in FIG. 1 includes two application servers 112-1, 112-2, in alternative implementations, the system 100 can include any suitable number of application servers. Further, although the server 102 deploys two different chatbots 310-1, 310-2 to the application servers 112-1, 112-2 in the example implementation of FIG. 1, in alternative implementations, the system 100 may include any suitable number of application servers, each running a different chatbot deployed thereon by the server 102. Also, in the example implementation shown in FIG. 1, the chatbots 310-1, 310-2 are shown as residing on two distinct application servers 112-1, 112-2, however, in alternative implementations, the 310-1, 310-2 may reside on a single server or computer.

Figure 2:
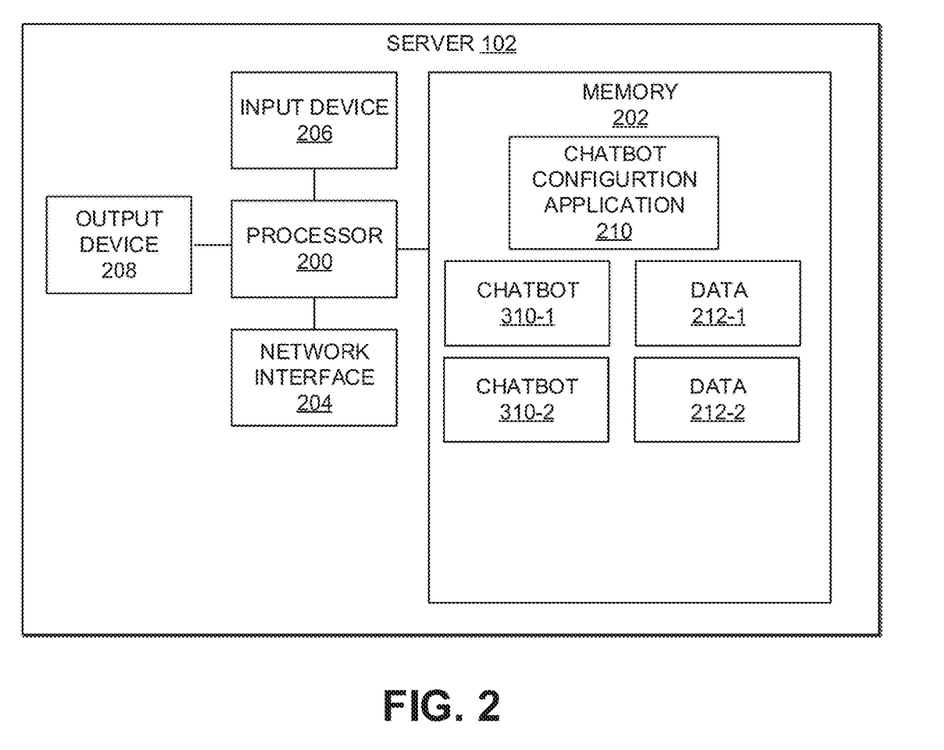
FIG. 2 is a block diagram of a chatbot configuration server of FIG. 1.

Attention is now directed to FIG. 2 which shows an example implementation of the server 102. The server 102 includes a processor 200, memory 202, a network interface 204, an input device 206, and an output device 208. The processor 200, memory 202, network interface 204, the input device 206 and the output device 208 are electrically interconnected and can be physically contained within a housing or frame. The server 102 may be computer, such as for example, a rack-mount server, blade server, tower server, or another kind of computer, or a process or program running on such a computer.

The processor 200 is configured to execute instructions, which can originate from the memory 202 or the network interface 204. The processor 200 can be known as a central processing unit (CPU). The processor 200 can include one or more sub-processors or processing cores. The processor 200 controls the overall operation of the server 102.

The memory 202 includes a non-transitory computer-readable medium that is configured to store programs or applications and data, including the chatbot configuration application 210, the chatbots 310-1, 310-2 created by a configuration user of the chatbot configuration application 210 and deployed to the application servers 112-1, 112-2 respectively, data 212-1 for the chatbot 310-1, and data 212-2 for the chatbot 310-2. The memory 202 can include one or more short-term or long-term storage devices, such as a solid-state memory chip (e.g., DRAM, ROM, non-volatile flash memory), a hard drive, an optical storage disc, and the like. The memory 202 can include fixed components that are not physically removable from the server (e.g., fixed hard drives) as well as removable components (e.g., removable virtual hard drives). The memory 202 allows for random access.

The network interface 204 is configured to enable server 102 to communicate with other computers, including application servers 1121, 112-2 and the client device 104, via the network 106. The network interface 204 includes one or more of a wired and wireless network adaptor as well as a software or firmware driver for controlling such adaptor.

The input device 206 can include any suitable input device, such as, for example, a keyboard, mouse, touch-sensitive element of a touch-screen display, or similar device. In alternative implementations, the input device 206 can be remote to the server 102 and input from the input device 206 can be provided via the network interface 204 to the server 102 from a computing device, such as for example, the client device 104, operated by a remote administrator.

The output device 208 can include a display device, such as a monitor, a bank of light-emitting diodes (LEDs), or similar for monitoring operations of server 102. It will be appreciated that in alternative implementations, the server 102 may not include an output device 208.

The chatbot configuration application 210 is a computer program or application that includes computer-readable instructions that can be executed by the processor 200 of the server for creating, modifying, and deploying chatbots to third-party computing platforms running on application servers, such as for example, applications servers 112-1, 112-2. For purposes of the present disclosure, the server 102 is running chatbot configuration application 210 when the processor 200 is executing the computer-readable instructions of the chatbot configuration application 210. Also, in the example implementation shown in FIG. 2, chatbots 310-1, 310-2 have been previously created by a configuring user using the client device 104 (e.g. by interacting with a graphical user interface (GUI) rendered on the display device 110 using the input device 108), and stored in memory 202 as chatbots 310-1, 310-2. Moreover, the chatbots 310-1, 310-2 have been deployed to the application servers 112-1, 112-2, respectively, using the network interface 204 and the network 106, and are integrated into the applications 314-1, 314-2 as described in further detail below. Each respective chatbot 310-1, 310-2 includes multiple conversation paths that can be navigated or traversed by an end user of the respective chatbot 310-1, 310-2 when the end user is interacting with the respective chatbot 310-1, 310-2. Each conversation path represents a different conversation between the chatbot 310-1 and an end user. Each conversation path includes multiple conversation nodes, and each conversation node includes computer-readable instructions executable by the processor 300 to perform an action. Such actions include, for example, outputting a textual message in the UI rendered on the display device 118 of the end user client device 114, outputting an image or video in the UI rendered on the display device 118 of the end user client device 114, or executing a configurable function.

The processor 200 of the server 102 receives from the application server 112-1 via the network 106 and the network interface 204, data for the chatbot 310-1, and stores the data in the memory 202 as data 212-1. The data received from the application server 112-1 includes data representative of the number of end users that have interacted with each respective conversation node of each respective conversation path. The processor 200 of the server 102 can receive data continuously from the application server 112-1 in real time or periodically at predefined time intervals, such as for example, at discrete time periods.

The processor 200 of the server 102 receives from the application server 112-2 via the network 106 and the network interface 204, data for the chatbot 310-2, and stores the data in the memory 202 as data 212-2. The data received from the application server 112-2 includes data representative of the number of end users that have interacted with each respective conversation node of each respective conversation path. The processor 200 of the server 102 can receive data from the application server 112-2 continuously in real time or periodically at predefined time intervals, such as for example, at discrete time periods.

Figure 3:
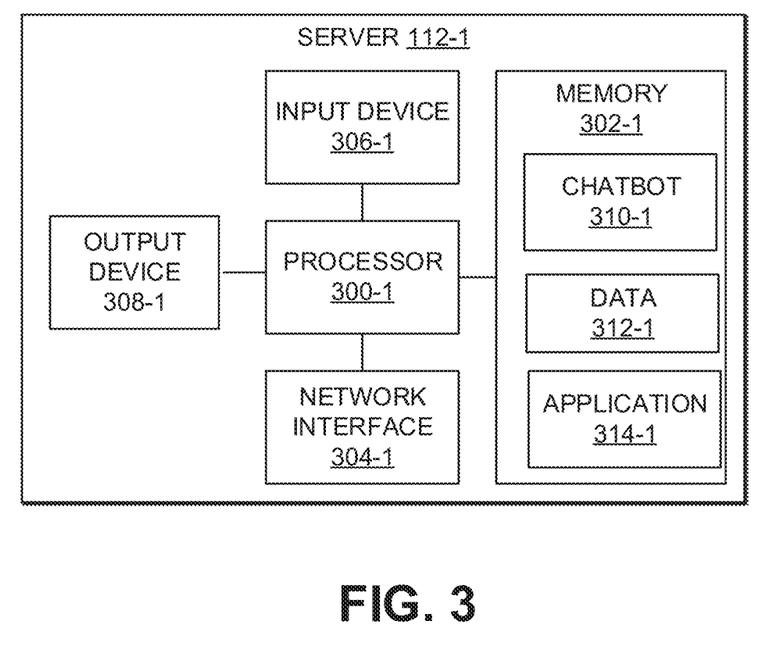
FIG. 3 is a block diagram of a chatbot server of FIG. 1.

Attention is now directed to FIG. 3 which shows an example implementation of the application server 112-1. The application server 112-1 includes a processor 300-1, memory 302-1, a network interface 304-1, an input device 306-1, and an output device 308-1. The processor 300-1, memory 302-1, network interface 304-1, the input device 306-1 and the output device 308-1 are electrically interconnected and can be physically contained within a housing or frame. The application server 112-1 may be computer, such as for example, a rack-mount server, blade server, tower server, or another kind of computer, or a process or program running on such a computer.

The processor 300-1 is configured to execute instructions, which may originate from the memory 302-1 or the network interface 304-1. The processor 300-1 may be known as a central processing unit (CPU). The processor 300-1 can include one or more sub-processors or processing cores. The processor 300-1 controls the overall operation of the chatbot server 112-1.

The memory 302-1 includes a non-transitory computer-readable medium that is configured to store programs or applications and data, including the chatbot 310-1, data 312-1 associated with the chatbot 310-1, and the application 314-1. The memory 302-1 can include one or more short-term or long-term storage devices, such as a solid-state memory chip (e.g., DRAM, ROM, non-volatile flash memory), a hard drive, an optical storage disc, and the like. The memory 302-1 can include fixed components that are not physically removable from the server (e.g., fixed hard drives) as well as removable components (e.g., removable virtual hard drives). The memory 202 allows for random access.

The network interface 304-1 is configured to enable the application 314-1, and the application server 112-1 to communicate with other computers, including server 102 and end user client devices 114, via the network 106. The network interface 304-1 includes one or more of a wired and wireless network adaptor as well as a software or firmware driver for controlling such adaptor.

The input device 306-1 can include any suitable input device, such as, for example, a keyboard, mouse, touch-sensitive element of a touch-screen display, or similar device. In alternative implementations, the input device 306-1 can be remote to the application server 112-1 and input from the input device 306-1 can be provided via the network interface 304-1 to the application server 112-1 from a computing device, such as for example, an end user client device 114, operated by a remote administrator.

The chatbot 310-1 is a computer program or application that includes computer-readable instructions, which when executed by the processor 300-1 causes the processor 300-1 to provide a user interface (UI) to an end user client device 114 for rendering on the display device 118 of the end user client device 114. End users of the end user client device 114 can interact with the chatbot 310-1 via the UI using the input device 116 of the end user client device 114. Each time an end user interacts with the chatbot 310-1 via the UI, the processor 300-1 records and stores the number of users that have interacted with the conversation nodes in each respective conversation path of the chatbot 310-1 in data 312-1 of the memory 302-1. The data 312-1 is transmitted to the server 102 via the network, in real time or periodically, for storage thereon.

The application 314-1 can be any third-party application, such as for example, a social media application, instant message application, news application, and the like. The application 314-1 includes an application program interface (API) configured to enable the chatbot 310-1 to be deployed and integrated into the application 314-1.

Figure 4:
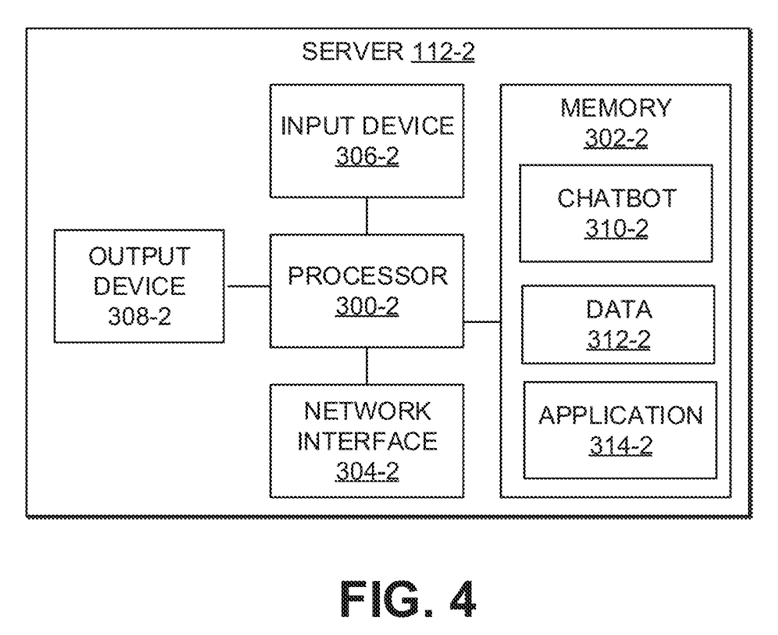
FIG. 4 is a block diagram of another chatbot server of FIG. 1.

Attention is now directed to FIG. 4 which shows an example implementation of the application server 112-2. The application server 112-2 includes a processor 300-2, memory 302-2, a network interface 304-2, an input device 306-2, and an output device 308-2. The processor 300-2, memory 302-2, network interface 304-2, the input device 306-2 and the output device 308-2 are electrically interconnected and can be physically contained within a housing or frame. The application server 112-2 may be computer, such as for example, a rack-mount server, blade server, tower server, or another kind of computer, or a process or program running on such a computer.

The processor 300-2 is configured to execute instructions, which may originate from the memory 302-2 or the network interface 304-2. The processor 300-2 may be known as a central processing unit (CPU). The processor 300-2 can include one or more sub-processors or processing cores. The processor 300-2 controls the overall operation of the application server 112-2.

The memory 302-1 includes a non-transitory computer-readable medium that is configured to store programs or applications and data, including the chatbot 310-2, data 312-1 associated with the chatbot 310-2, and the application 314-2. The memory 302-1 can include one or more short-term or long-term storage devices, such as a solid-state memory chip (e.g., DRAM, ROM, non-volatile flash memory), a hard drive, an optical storage disc, and the like. The memory 302-2 can include fixed components that are not physically removable from the server (e.g., fixed hard drives) as well as removable components (e.g., removable virtual hard drives). The memory 202 allows for random access.

The network interface 304-2 is configured to enable the application server 112-2 to communicate with other computers, including server 102 and end user client devices 114, via the network 106. The network interface 304-1 includes one or more of a wired and wireless network adaptor as well as a software or firmware driver for controlling such adaptor.

The input device 306-2 can include any suitable input device, such as, for example, a keyboard, mouse, touch-sensitive element of a touch-screen display, or similar device. In alternative implementations, the input device 306-2 can be remote to the application server 112-2 and input from the input device 306-2 can be provided via the network interface 304-2 to the application server 112-2 from a computing device, such as for example, an end user client device 114, operated by a remote administrator.

The chatbot 310-2 is a computer program or application that includes computer-readable instructions, which when executed by the processor 300-2 causes the processor 300-2 to provide a user interface (UI) to an end user client device 114 for rendering on the display device 118 of the end user client device 114. End users of the end user client device 114 can interact with the chatbot 310-2 via the UI using the input device 116 of the end user client device 114. Each time an end user interacts with the chatbot 310-2 via the UI, the processor 300-2 records and stores the number of users that have interacted with the conversation nodes in each respective conversation path of the chatbot 310-2 in data 312-2 of the memory 302-2. The data 312-2 is transmitted to the server 102 via the network, in real time or periodically, for storage thereon.

The application 314-2 can be any third-party application, such as for example, a social media application, instant message application, news application, and the like. The application 314-2 includes an application program interface (API) configured to enable the chatbot 310-2 to be deployed and integrated into the application 314-2.

Figure 5A:
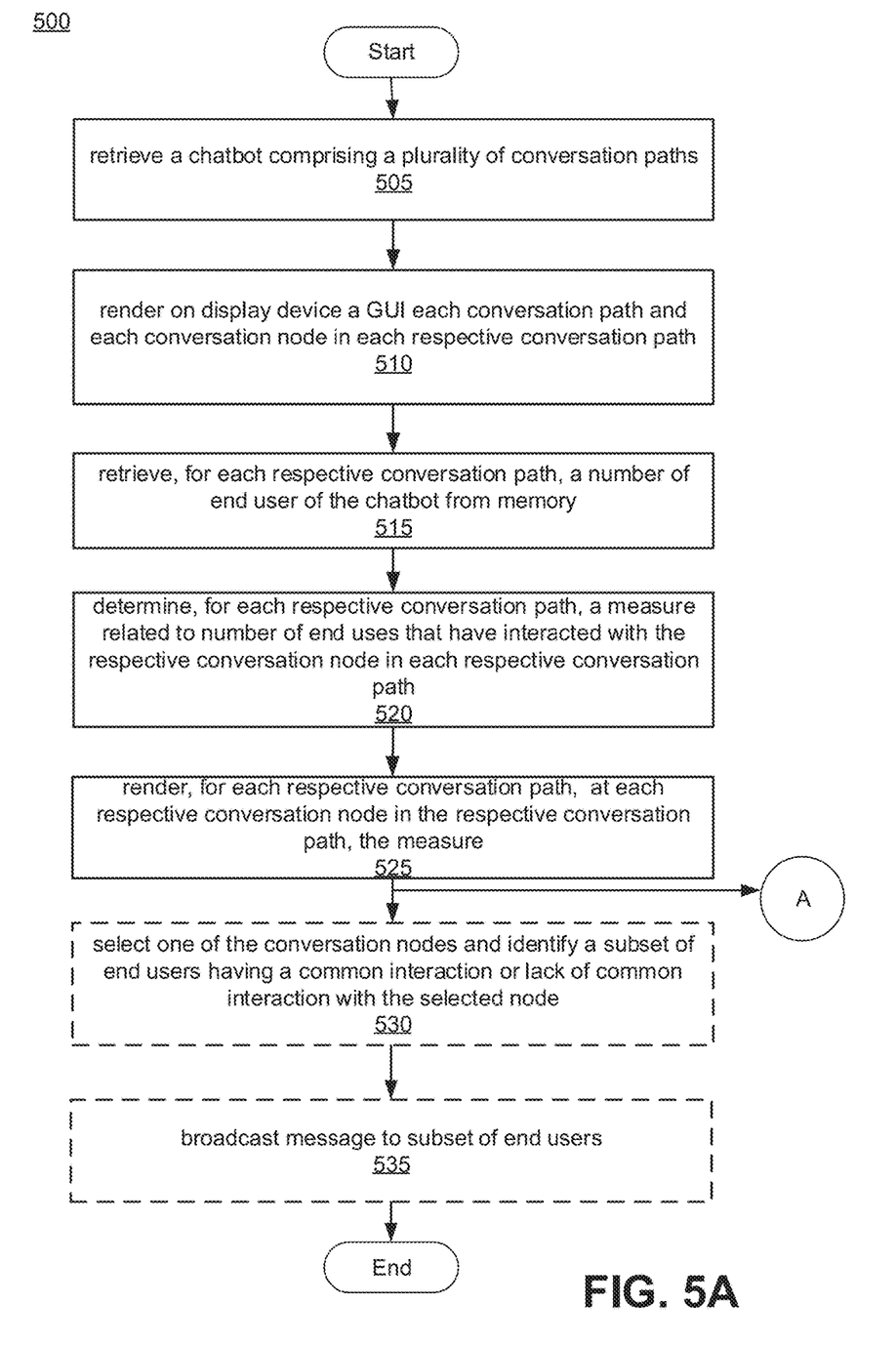
FIGS. 5A and 5B are a flowchart of a method performed by the chatbot configuration server of FIG. 1.
Figure 5B:
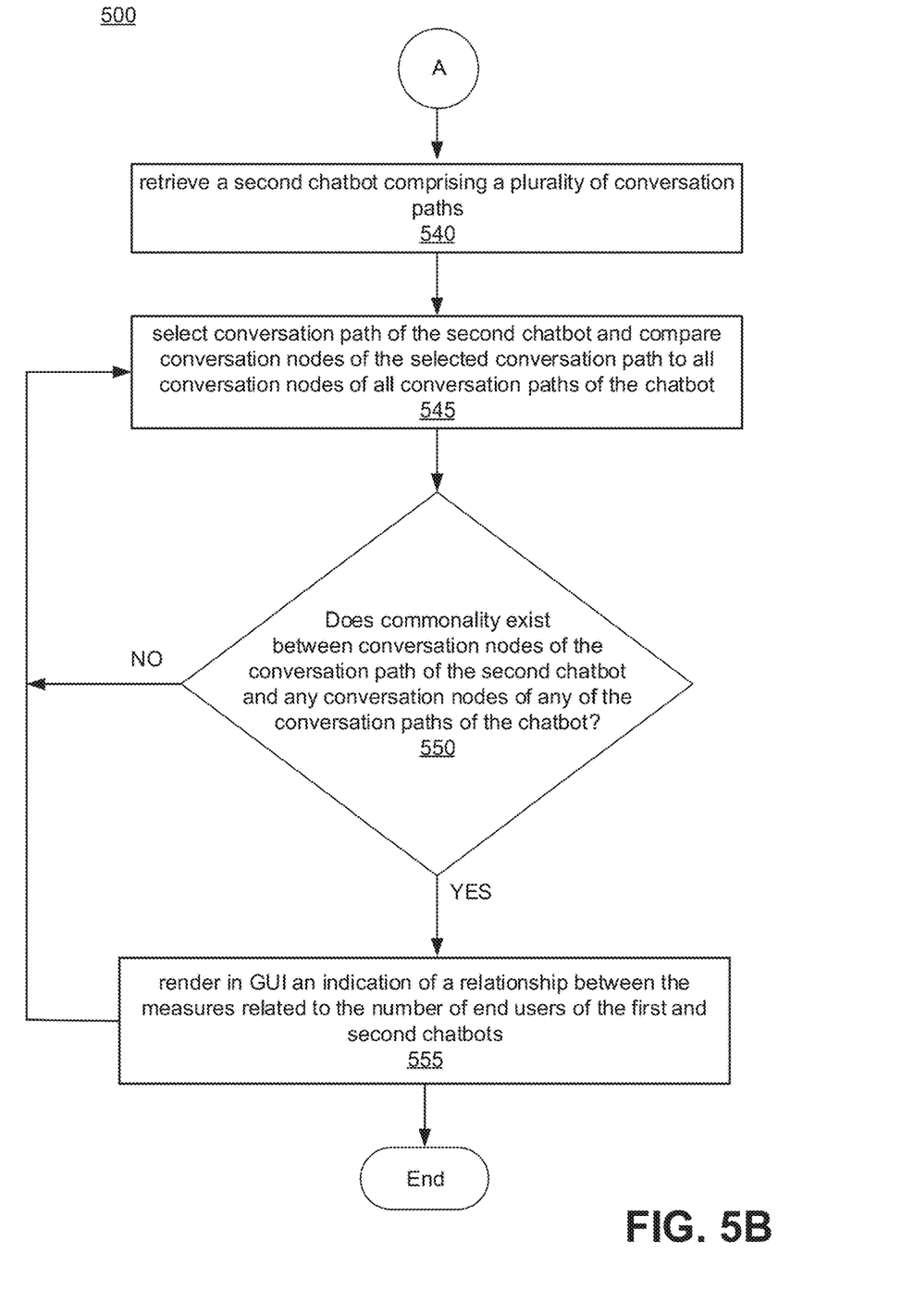

Attention is now directed to FIGS. 5A and 5B which depict a flowchart of a method 500 for rendering information in a graphical user interface (GUI) related to a chatbot, according to non-limiting implementations. To assist in the explanation of method 500, it will be assumed that method 500 is performed by the server 102, and specifically by processor 200 of the server 102. Indeed, method 500 is one way in which the server 102 can be configured. Furthermore, the following discussion of method 500 will lead to a further understanding of the server and system 100 and its various components. However, it is to be understood that system 100 and/or method 500 can be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of system 100 as well.

Method 500 begins at block 505 where the processor 200 of the server 102 retrieves from memory 202 a chatbot stored therein. For the purposes of the explanation of the method 500, it is assumed that the server 102 retrieves the chatbot 310-1 from the memory 202; however the method 500 works in a similar manner when the server 102 retrieves the chatbot 310-2 from the memory 202.

As mentioned above, the chatbot 310-1 includes a plurality of conversation paths. Each conversation paths represents a different conversation between the chatbot 310-1 and an end user. Each conversation path includes a plurality of conversation nodes. Each conversation node includes computer-readable instructions executable by the processor 300-1 of the application server 112-1 to perform an action, such as, for example, outputting a textual message to the end user using the UI provided by the application server 112-1, outputting an image or video to the end user using the UI provided by the application server 112-1, or executing a configurable function. The method then proceeds to block 510.

Figure 6:
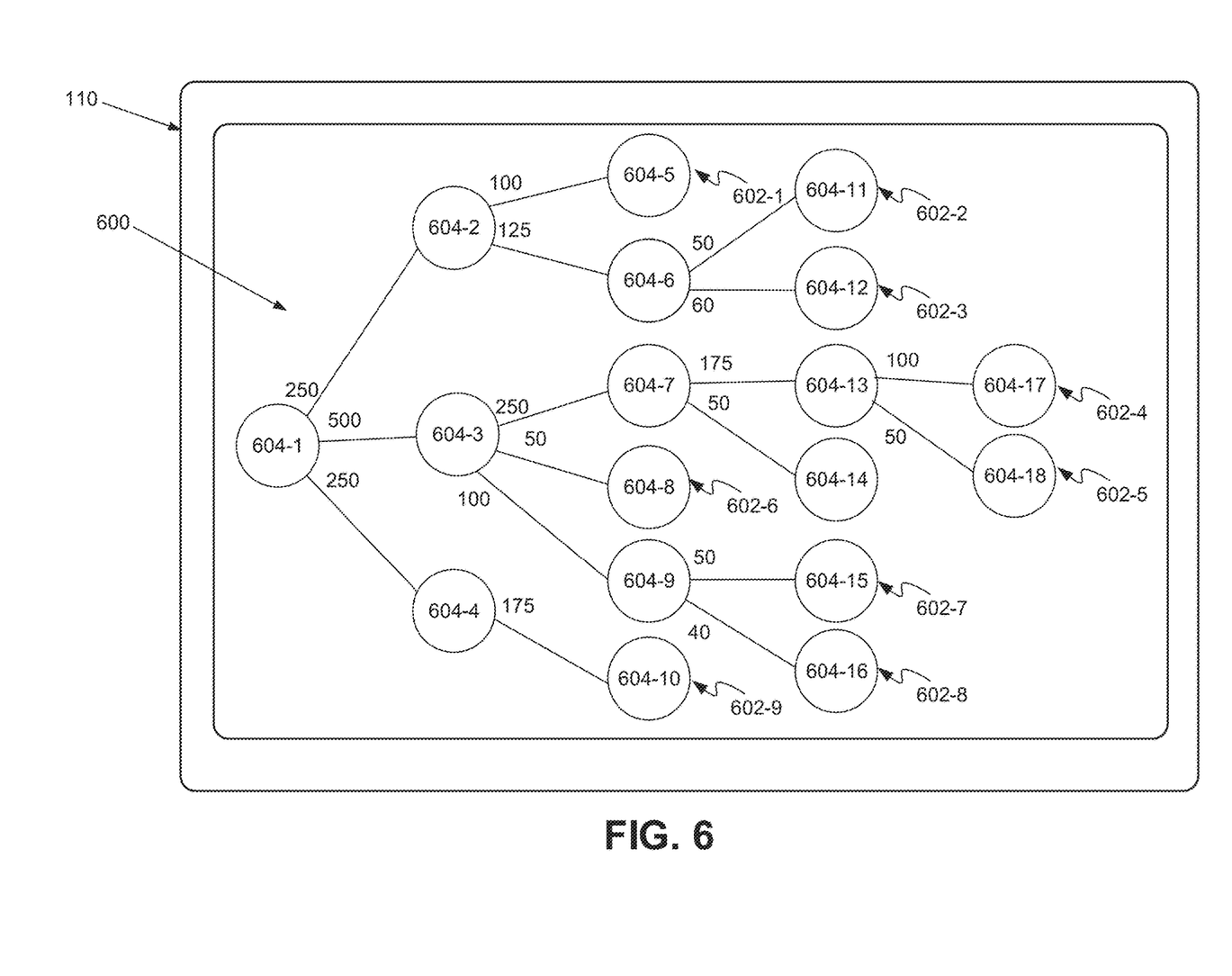
FIG. 6 is a diagram of a graphical user interface provided by the chatbot configuration server of FIG. 1 in accordance with an example implementation of the present disclosure.

At block 510, a GUI is provided to the client device 104 for rendering on a display device 110 of the client device 104 to display to the configuring user each conversation path and each conversation node in each respective conversation path. An example of the GUI 600 provided to the client device 104 for rendering on the display device 110 of the client device 104 is shown in FIG. 6. The GUI 600 shown in FIG. 6 includes nine conversation paths 602-1, 602-2, 602-3, 602-4, 602-5, 602-6, 602-7, 602-8, 602-9 (referred to hereinafter generically as conversation path 602 and collectively as conversation paths 602), and eighteen conservation nodes 604-1, 604-2, 604-3, 604-4, 604-5, 604-6, 604-7, 604-8, 604-9, 604-10, 604-11, 604-12, 604-13, 604-14, 604-15, 604-16, 604-17, 604-18 (referred to hereinafter generically as conversation node 604 and collectively as conversation nodes 604). The conversation path 602-1 includes conversation nodes 604-1, 604-2, 604-5; the conversation path 602-2 includes conversation nodes 604-1, 604-2, 604-6, 604-11; the conversation path 602-3 includes conversation nodes 604-1, 604-2, 604-6, 604-12; the conversation path 602-4 includes conversation nodes 604-1, 604-3, 604-7, 604-13, 604-17; the conversation path 602-5 includes conversation nodes 604-1, 604-3, 604-7, 604-13, 604-18; the conversation path 602-6 includes conversation nodes 604-1, 604-3, 604-8; the conversation path 602-7 includes conversation nodes 604-1, 604-3, 604-9, 604-15; the conversation path 602-8 includes conversation nodes 604-1, 604-3, 604-9, 604-16; the conversation path 602-9 includes conversation nodes 604-1, 604-4, 604-10; and the conversation path 602-10 includes conversation nodes 604-1, 604-3, 604-7, 604-14. It will be appreciated that the number of conversation paths 602 and conversation nodes 604 shown in FIG. 6 are purely exemplary and that the chatbot 310-1 may include any suitable number of conversation paths 602 and conversation nodes 604. The method then proceeds to block 515.

At block 515, data 212-1 is retrieved from the memory 202. The data includes, for each respective conversation path 602 of the chatbot 310-1, data indicative of a number of end users of the chatbot 310-1 that have interacted with each respective conversation node 604 in the respective conversation path 602.

At block 520, for each respective conversation path 602 of the chatbot 310-1, a measure related to the number of end users of the chatbot 310-1 that have interacted with each respective conversation node 604 in the respective conversation path 602 is determined. In some implementations, determining the measure includes determining a total number of end users of the chatbot 310-1 that have interacted with the respective conversation node 604. In other implementations, determining a percentage of the total number of end users of the chatbot 310-1 that have interacted with the respective conversation node 604. The method proceeds to block 525.

At block 525, for each respective conversation path 602 of the chatbot 310-1, the measure related to the number of end users of the chatbot 310-1 that have interacted with the respective conversation node 604 in the respective conversation path 604 is rendered in the GUI 600 at each respective conversation node 604 in the respective conversation path 602. In some implementations, rendering the measure related to the number of end users of the chatbot 310-1 that have interacted with the respective conversation node 604 in the respective conversation path can include rendering a heat map. The method 500 can then optionally proceed to block 530 or end.

When the method 500 proceeds to block 530, one of the conversation nodes 604 is selected and a subset of end users of the chatbot 310-1 as having a common interaction or a common lack of interaction with the selected conversation node is identified. The method then proceeds to block 535.

At block 535, a message is broadcast to the subset of end users. When the subset of end users has a common lack of interaction with the selected conversation node 640, the message that is broadcast to the subset of end users includes an offer to entice the subset of end users of the chatbot 310-1 to return to interacting with the chatbot 310-1. The broadcast can be made through the chatbot 310-1 and may appear as the chatbot 310-1 continuing or restarting the conversation that the end users dropped. The broadcast can be implemented by transferring these end users to a specific node in the chatbot 310-1. For example, if the conversation is to be restarted, then the end users can be transferred to the starting node. In another example, a subset of nodes is specifically established for this situation (e.g., to reignite a conversation with users who have apparently lost interest), with the broadcast thereby transferring the end users to the first node of the subset. In another example, the broadcast transfers these end users to the next node after where the interaction ceased, effectively moving the conversation forward despite the end users losing interest. In still another example, the broadcast is an out-of-band message, such as an email. The method 500 then ends.

In some implementations, after block 525, the method 500 proceeds to block 540 (FIG. 5B) via A. When the method 500 proceeds to block 540, the processor 200 of the server 102 retrieves from memory 202 the chatbot 310-2 stored therein. As mentioned above, the chatbot 310-2 includes a plurality of conversation paths 602, and each conversation paths 602 represents a different conversation between the chatbot 310-2 and an end user. Each conversation path 602 includes a plurality of conversation nodes 604. Each conversation node 604 includes computer-readable instructions executable by the processor 300-2 of the application server 112-2 to perform an action, such as, for example, outputting a textual message to the end user using the UI provided by the application server 112-2, outputting an image or video to the end user using the UI provided by the application server 112-2, or executing a configurable function. After retrieving the chatbot 310-2, the method proceeds to block 545.

At block 545, a conversation path 602 of the chatbot 310-2 is selected and the conversation nodes 604 of the selected conversation path 602 are compared to all the conversation nodes 604 of all conversation paths 602 of the chatbot 310. The method then proceeds to block 550.

At block 550, a determination is made whether a commonality exists between conversation nodes 604 of the conversation path 602 of the chatbot 310-2 and any conversation nodes 604 of any of the conversation paths 604 of the chatbot 310-1. Commonality can be determined using pattern matching, tree structure pattern matching, regular expressions, keyword matching, lexical or semantic text matching, or similar techniques. For example, tree pattern matching may be used to determine a structural commonality between conversation paths of the chatbots, with lexical text matching being used to determine a content commonality between the similar structures. The structural commonality and content commonality can be taken individually or combined to arrive at a commonality. When a sufficient commonality exists between conversation nodes 604 of the conversation path 604 of the chatbot 310-2 and any conversation nodes 604 of any of the conversation paths 602 of the chatbot 310-1, the method 500 proceeds to block 555. Otherwise, the method 500 returns to block 545 and another conversation path of the chatbot 310-2 is selected.

At block 550, the processor 200 of the server 102 provides a GUI to the client device 104 for rendering on the display device 110 that indicates an indication of a relationship between the measure related to the number of end users of the chatbot 310-2 that have interacted with the conversation nodes 604 of the conversation paths 604 of the chatbot 310-2 for which the commonality exists and a number of end users of the chatbot that have interacted with the conversation nodes 604 of the conversation paths 602 of the chatbot 310-1 for which the commonality exists. In some implementations, rendering the indication of the relationship includes rendering a heat map in the GUI. The heat map may be rendered numerically, textually, or graphically. For example, a number of users following a particular path or segment thereof may be outputted in conjunction with a number of users following paths (or segments) in other chatbots having sufficient commonality to the particular path (or segment). Such numbers may be expressed as a percentage or letter grade. Color or other graphic may be used. For example, a line between nodes may be color-coded to indicate the relative number of users following a particular path in a particular chatbot as compared to similar paths in other chatbots. A spectrum of color may be used, such as green indicating that the present path is performing as well as a similar path in other chatbots and red indicating a path that performs poorly with respect to a similar path in other chatbots.

The blocks 545, 550, 555 repeated until the conversation nodes 604 of all conversation paths 602 of the chatbot 310-2 have been compared to all conversation nodes 604 of all conversation paths 604 of the chatbot 310-1.

Referring again to FIG. 6, an example implementation of a GUI 600 provided by the server 102 for rendering on the display device 110 of a client device 104 after the processor 200 of the server 102 has performed the method 500 of FIG. is shown. The GUI 600 includes a visual representation of the conversation paths 602 and the conversation nodes 604 of the chatbot 310-1. In FIG. 6, a total number of end users of the chatbot 310-1 that have interacted with each respective conversation node 604 of each respective conversation path 602 is shown adjacent each conversation node 604.

Figure 7:
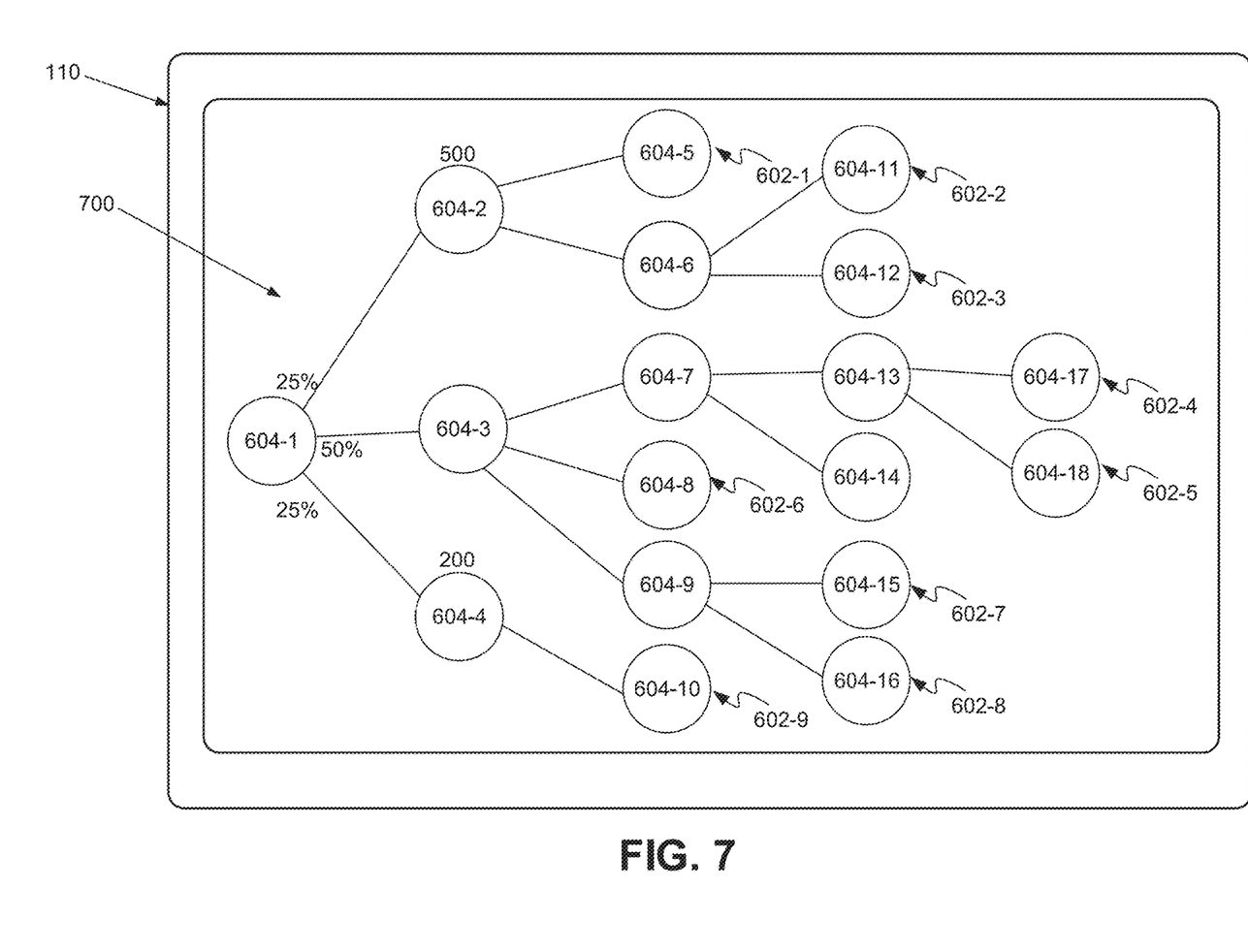
FIG. 7 is a diagram of another graphical user interface provided by the chatbot configuration server of FIG. 1 in accordance with another example implementation of the present disclosure.

Attention is now directed to FIG. 7 which shows another example implementation of a GUI 700 provided by the server 102 for rendering on the display device 110 of a client device 104 after the processor 200 of the server 102 has performed the method 500 of FIG. 5. The GUI 700 includes a visual representation of the conversation paths 602 and the conversation nodes 604 of the chatbot 310-1. In FIG. 7, a percentage of the total number of end users of the chatbot 310-1 that have interacted with each respective conversation node 604 of each respective conversation path 604 is shown adjacent each conversation node 604.

Figure 8:
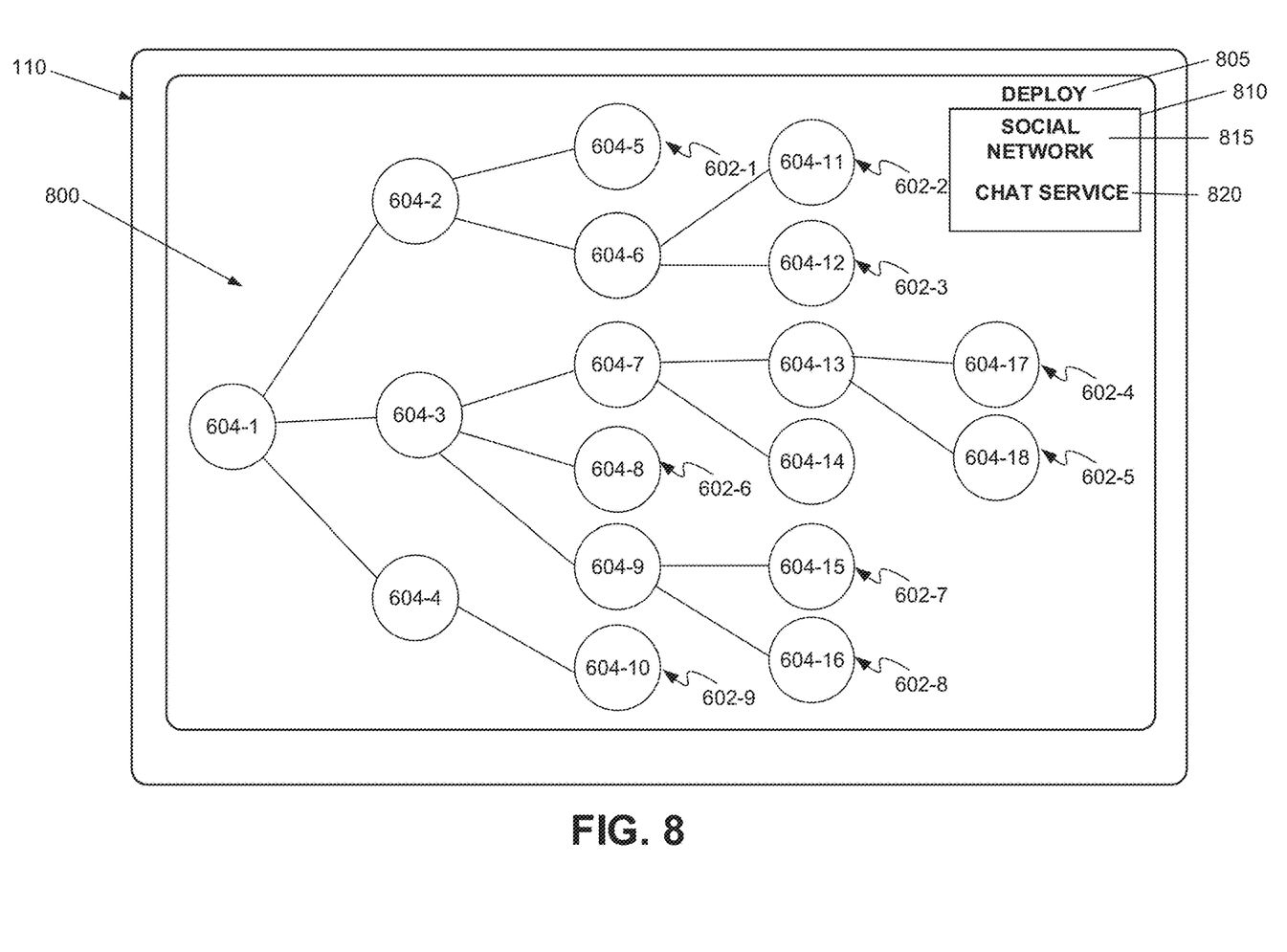
FIG. 8 is a diagram of another graphical user interface provided by the chatbot configuration server of FIG. 1 in accordance with another example implementation of the present disclosure.

Attention is now directed to FIG. 8 which shows an example implementation of a GUI 800 provided by the server 102 for rendering on, for example, the display device 110 of the client device 104 after the processor 200 of the server 102 has performed the method 500 of FIG. 5. The GUI 800 is similar to the GUI 600 includes a visual representation of the conversation paths 602 and the conversation nodes 604 of the chatbot 310-1. The GUI 800 also includes selectable icon 805 for deploying and integrating the chatbot 310-1 into third party application, such as for example, the application 314-1 running on the application server 112-1 or the application running on the application server 112-2. As mentioned above, the applications 314-1, 314-2 running on the applications servers 112-1, 112-2 can be a social media application, an instant message application, and the like. Upon detecting a selection of the selectable icon 805, the processor 200 of the server 102 provides a menu 810 comprising selectable options for rendering the GUI 800. The menu includes a first selectable option 815 associated with the third-party application, e.g., Facebook ®, and a second selectable option 820 associated with the third-party application, e.g., KIK®. Upon detecting selection of the first selectable option 815, the processor 200 executes instructions of the chatbot configuration application 210 to communicate with an application program interface (API) of Facebook® to deploy and integrate the chatbot 310-1 into Facebook®. Similarly, upon detecting selection of the second selectable option 820, the processor 200 executes instructions of the chatbot configuration application 210 to communicate with an API of KIK® to deploy and integrate the chatbot 310-1 into KIK®.

It will be appreciated that although only two selectable options are rendering in the menu 810 in the example implementation shown in FIG. 8, in alternative implementations any suitable number of selectable options may be rendered in the menu 810, with each selectable option associated with a third-party application for deploying and deploying the chatbot rendered in the GUI 800 into the third-party application running on an application server.

Figure 9:
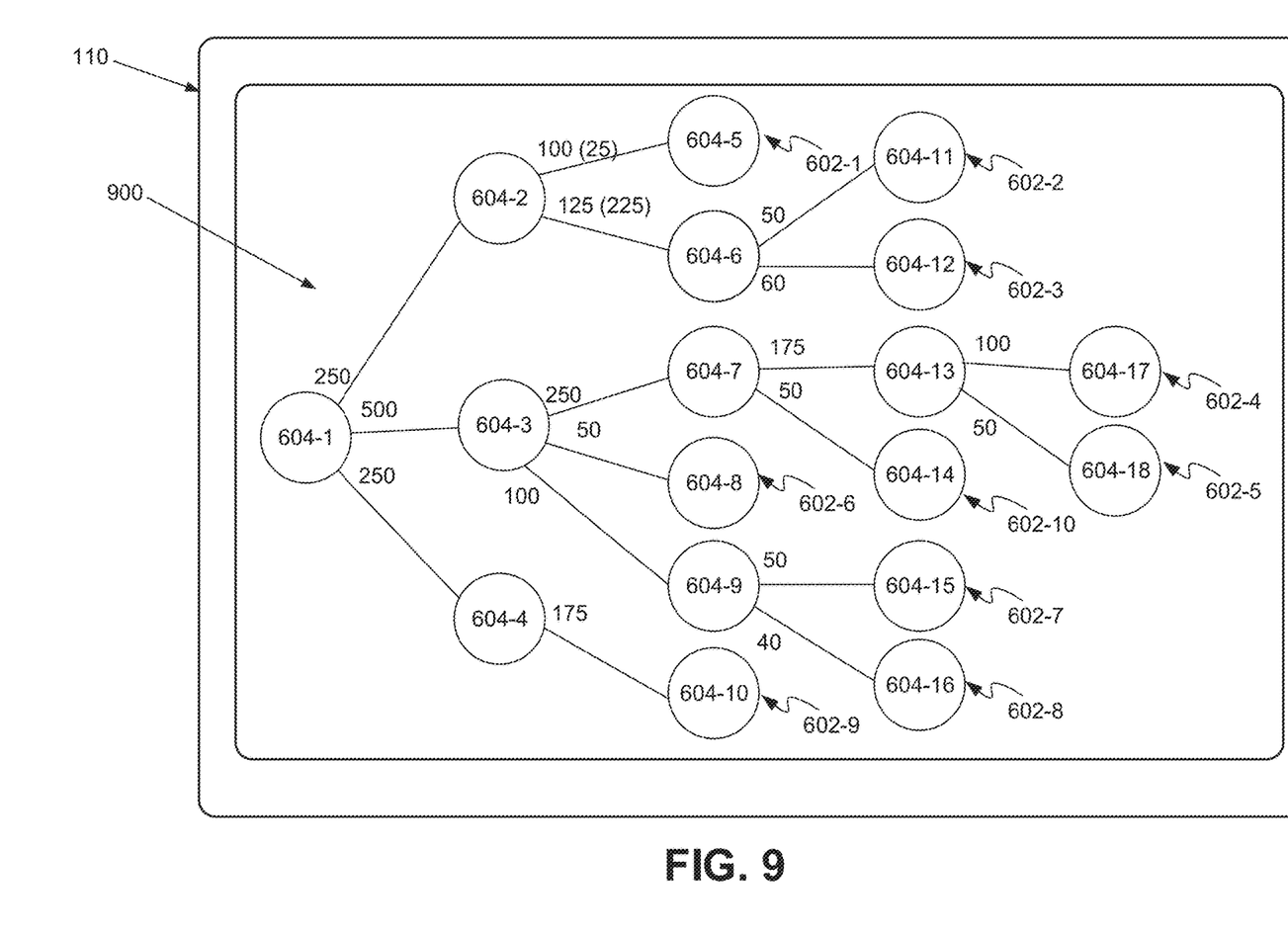
FIG. 9 is a diagram of another graphical user interface provided by the chatbot configuration server of FIG. 1 in accordance with another example implementation of the present disclosure.

Attention is now directed to FIG. 9 which shows another example implementation of a GUI 900 provided by the server 102 for rendering on the display device 110 of a client device 104 after the processor 200 of the server 102 has performed the method 500 of FIG. 5. The GUI 900 includes a visual representation of the conversation paths 602 and the conversation nodes 604-2 of the chatbot 310-1. In the example, the method 500 determined that a commonality existed between the conversation node 604-2 of the chatbot 310-1 and a conversation node of the chatbot 310-2, and an indication is rendered adjacent the conversation node 604-2 which shows the number of end users of the chatbot 310-1 that have interacted with the conversation node of the chatbot 310-1, and the number of end users of the chatbot 310-1 that have interacted with the similar conversation node of the chatbot 310-2. In the example implementation in FIG. 9, the number of end users of the chatbot 310-2 are shown in brackets in FIG. 9.

The methods of the present disclosure provide information in a graphical user interface to configuring users (e.g. creators or designers of chatbots) utilizing a chatbot configuration application to modify a chatbot to improve the performance of the chatbot. Further, the method of the present disclosure facilitates the deployment of chatbots created by configuring users.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method in a chatbot configuration application executable on a computing device, the method comprising:
   retrieving from memory a chatbot comprising a plurality of conversation paths, each conversation path representing a different conversation between the chatbot and an end user, each conversation path comprising a plurality of conversation nodes, and each conversation node comprising computer-readable instructions executable by a processor to perform an action;
   rendering, on a display device, a graphical user interface (GUI) to display to a configuring user each conversation path and each conversation node in each respective conversation path;
   for each respective conversation path in the chatbot:
      retrieving from the memory, a number of end users of the chatbot that have interacted with each respective conversation node in the respective conversation path;
      determining a measure related to the number of end users of the chatbot that have interacted with each respective conversation node in the respective conversation path; and,
      rendering, in the GUI at each respective conversation node in the respective conversation path, the measure related to the number of end users of the chatbot that have interacted with the respective conversation node in the respective conversation path;
   selecting one of the conversation nodes;
   identifying a subset of end users of the chatbot as having a common interaction or a common lack of interaction with the selected conversation node; and
   broadcasting a message to the subset of end users.

2. The method of claim 1, wherein the action comprises outputting a textual message to the end user.

3. The method of claim 1, wherein the action comprises outputting an image or video to the end user.

4. The method of claim 1, wherein the action comprises executing a configurable function.

5. The method of claim 1, wherein determining a measure comprises determining a total number of end users of the chatbot that have interacted with the respective conversation node.

6. The method of claim 5, wherein determining a measure comprises determining a percentage of the total number of end users of the chatbot that have interacted with the respective conversation node.

7. The method of claim 1, wherein rendering the measure comprises rendering a heat map.

8. The method of claim 1, wherein the subset of end users has a common lack of interaction with the selected conversation node, and wherein the message comprises an offer to entice the subset of end users of the chatbot to return to interacting with the chatbot.

9. The method of claim 1, further comprising:
rendering in the GUI, a plurality of selectable options, each selectable option associated with a platform for deploying the chatbot;
in response to detecting selection of a selectable option of the plurality of selectable options, configuring the chatbot for deployment to the platform associated with the selectable option that is selected; and,
initiating deployment of the chatbot to the platform associated with the selectable option that is selected.

10. A method in a chatbot configuration application executable on a computing device, the method comprising:
retrieving from memory a first chatbot comprising a plurality of conversation paths, each conversation path representing a different conversation between the first chatbot and an end user, each conversation path comprising a plurality of conversation nodes, and each conversation node comprising computer-readable instructions executable by a processor to perform a first action;
rendering, on a display device, a graphical user interface (GUI) to display to a configuring user each conversation path and each conversation node in each respective conversation path of the first chatbot;
for each respective conversation path in the first chatbot:
retrieving from the memory, a number of end users of the first chatbot that have interacted with each respective conversation node in the respective conversation path;
determining a measure related to the number of end users of the first chatbot that have interacted with each respective conversation node in the respective conversation path; and,
rendering, in the GUI at each respective conversation node in the respective conversation path, the measure related to the number of end users of the first chatbot that have interacted with the respective conversation node in the respective conversation path;
retrieving from the memory a second chatbot, the second chatbot comprising a plurality of conversation paths, each conversation path representing a different conversation between the second chatbot and an end user, each conversation path comprising a plurality of conversation nodes, and each conversation node comprising computer-readable instructions executable by a processor of a computing device to perform second action;
for a conversation path of the second chatbot:
determining whether a commonality exists between the conversation nodes of the conversation path of the second chatbot and any conversation nodes of any of the conversation paths of the first chatbot; and in response to determining that a commonality exists, rendering, in the GUI to the configuring user, an indication of a relationship between the measure related to the number of end users of the first chatbot that have interacted with the conversation nodes of the conversation paths of the first chatbot for which the commonality exists and a number of end users of the second chatbot that have interacted with the conversation nodes of the conversation paths of the second chatbot for which the commonality exists.

11. The method of claim 10, wherein rendering the indication of the relationship comprises rendering a heat map.

12. The method of claim 10, wherein one of the first action and the second action comprises outputting a textual message to the end user.

13. The method of claim 10, wherein one of the first action and the second action comprises outputting an image or video to the end user.

14. The method of claim 10, wherein one of the first action and the second action comprises executing a configurable function.

15. The method of claim 10, wherein determining the measure comprises determining a total number of end users of the first chatbot that have interacted with the respective conversation node.

16. The method of claim 15, wherein determining the measure comprises determining a percentage of the total number of end users of the first chatbot that have interacted with the respective conversation node.

17. The method of claim 10, wherein rendering the measure comprises rendering a heat map.

18. The method of claim 10, further comprising:
selecting one of the conversation nodes;
identifying a subset of end users of the first chatbot as having a common interaction or a common lack of interaction with the selected conversation node; and
broadcasting a message to the subset of end users, wherein the subset of end users has a common lack of interaction with the selected conversation node, and wherein the message comprises an offer to entice the subset of end users of the first chatbot to return to interacting with the first chatbot.

19. The method of claim 10, further comprising:
rendering in the GUI, a plurality of selectable options, each selectable option associated with a platform for deploying the first chatbot;
in response to detecting selection of a selectable option of the plurality of selectable options, configuring the first chatbot for deployment to the platform associated with the selectable option that is selected; and,
initiating deployment of the first chatbot to the platform associated with the selectable option that is selected.

* * * * *